United States Patent [19]
Yoo

[11] Patent Number: 5,999,605
[45] Date of Patent: Dec. 7, 1999

[54] MULTIPLE SUBSCRIBER IMPLEMENTING METHOD IN KEY PHONE SYSTEM

[75] Inventor: Choon-Ho Yoo, Seoul, Rep. of Korea

[73] Assignee: SamSung Electronics Co., Ltd., Suwon, Rep. of Korea

[21] Appl. No.: 08/759,105

[22] Filed: Dec. 2, 1996

[30] Foreign Application Priority Data

Nov. 30, 1995 [KR] Rep. of Korea ............... 95/45689

[51] Int. Cl.$^6$ ............................................. H04M 1/00
[52] U.S. Cl. ..................... 379/165; 379/156; 379/161
[58] Field of Search ............................... 379/156, 165, 379/166, 163, 242, 243, 244, 245, 246, 248, 232, 233, 265, 266, 161

[56] References Cited

U.S. PATENT DOCUMENTS

| | | | |
|---|---|---|---|
| 4,682,353 | 7/1987 | Inoue et al. ................ | 379/163 |
| 4,893,336 | 1/1990 | Wuthnow .................... | 379/211 |
| 4,958,369 | 9/1990 | Tsuchida .................... | 379/156 |
| 5,070,524 | 12/1991 | Mano ......................... | 379/165 |
| 5,121,424 | 6/1992 | Mano ......................... | 379/165 |
| 5,153,908 | 10/1992 | Kakizawa et al. ........ | 379/157 |
| 5,182,768 | 1/1993 | Nakano et al. ........... | 379/387 |
| 5,204,861 | 4/1993 | Wiebe ........................ | 379/156 |
| 5,481,605 | 1/1996 | Sakurai et al. ............ | 379/243 |
| 5,513,256 | 4/1996 | Komuro ..................... | 379/156 |

*Primary Examiner*—Curtis A. Kuntz
*Assistant Examiner*—Binh K. Tieu
*Attorney, Agent, or Firm*—Robert E. Bushnell, Esq.

[57] ABSTRACT

A multiple subscriber implementing method in a key phone system having an integrated service digital network trunk card connected to a digital telephone line, a public switched telephone network trunk card connected to an analog telephone line and an internal memory containing a plurality of logic ports and registered numbers each indicating a corresponding called subscriber terminal, including a call reception routine of connecting an incoming call containing a called subscriber number to a specific port of a corresponding called subscriber terminal when the incoming call is received through the digital telephone line and the called subscriber number corresponds to one of the registered numbers contained in the internal memory; and a call transmission routine of registering a called subscriber number and transmitting an outgoing call when the digital telephone line is seized by a private line subscriber.

25 Claims, 5 Drawing Sheets

| OFFICE LINE PORT NUMBER | MSN NUMBER | LOGIC PORT NUMBER |
|---|---|---|
| 701 | 460 2000 | 701-1 |
|  | 460 2001 | 701-2 |
|  | 460 2002 | 701-3 |
| ⋮ | ⋮ | ⋮ |
|  | NULL | 701 |

*Fig. 2A*

| PRIVATE LINE NUMBER | OFFICE LINE PORT NUMBER | MSN NUMBER |
|---|---|---|
| 201 | 701 | 460 2001 |
|  | 702 | 460 2002 |
| ⋮ | ⋮ | ⋮ |

*Fig. 2B*

MULTIPLE SUBSCRIBER IMPLEMENTING METHOD IN KEY PHONE SYSTEM

CLAIM FOR PRIORITY UNDER 35 U.S.C. §119

This application makes reference to, incorporates the same herein, and claims all benefits accruing under 35 U.S.C. §119 from an application for Multiple Subscriber Implementing Method In Key Phone System earlier filed in the Korean Industrial Property Office on Nov. 30, 1995 and there duly assigned Ser. No. 45689/1995.

BACKGROUND OF THE INVENTION

1. Technical Field

The present invention relates to a key phone system accommodating both an integrated service digital network (ISDN) and a public service telephone network (PSTN), and relates more particularly to a multiple subscriber service implementing method for a call reception service and a call transmission service in a key phone system accommodating multiple subscribers through either an integrated service digital network (ISDN) line or a public service telephone network (PSTN) line.

2. Background Art

Generally, a key phone system includes a plurality of telephone sets and a central unit adapted to selectively set up a connection between one of the telephone sets and a selected one of a plurality of central office lines. Each of the telephone sets is provided with a hold button and a plurality of sets of central office lamps and buttons, each set corresponding on a one-to-one basis to the central office lines. The central office lamps allow the user to visualize the status of each individual central office line. A central office lamp turns off while the central office line is idle, turns on while the central office line is in use, flashes slowly while the central office line is being held, and flashes rapidly while an incoming call is being received over the central office line. The central office buttons are available for selecting and seizing any of the central office lines. The central unit detects an operation of the central office buttons which may occur at any telephone set so as to connect the telephone set to the selected central office line. Examples of such a key telephone system are disclosed in U. S. Pat. No. 4,682,353 for Key Telephone System issued to Inoue et al., U.S. Pat. No. 5,513,256 for Key Telephone System issued to Komuro, and U.S. Pat. No. 5,544,231 for Conversation Recording/Playback Method In A Key Phone System issued to Cho.

In a traditional public service telephone network (PSTN), central office lines are conventional analog lines. As a result, only a single telephone call can be transmitted or received via a single central office line. In recent years, however, an integrated services digital network (ISDN) allows a single central office line to transmit or receive a plurality of telephone calls such as disclosed in U.S. Pat. No. 5,182,768 for Digital Telephone Set Capable Of Being Simultaneously Used By A Plurality of Persons By Using One Transmission Line issued to Nakano et al. The emergence of integrated service digital network allows the key phone system to accommodate both the digital and analog telephone networks in a manner such as exemplary disclosed in U.S. Pat. No. 4,958,369 for Key Telephone System Accommodating Both Digital And Analog Telephone Networks issued to Tsuchida, U.S. Pat. No. 5,070,524 for Telephone System issued to Mano, and U.S. Pat. No. 5,121,424 for Telephone System And Speech Level Adjusting Method Therefor issued to Mano. For example, Tsuchida '369 discloses a key phone system which allows the user to perform different calling transmission operations in accordance with the type of central office line acquired. A display unit is provided to inform the user whether the central office line is either an integrated service digital network line or a public service telephone network line so that the user can fully utilize various functions available in the integrated service digital network. Mano '524 and '424 seek to automatically regulate the transmission speech loss irrespective of whether the central office line is either an integrated service digital network line or a public service telephone network line. However, it has been my observation that none of the conventional key telephone systems discloses a simple and yet effective way to provide a call reception service and a call transmission service for both the integrated service digital network and public service telephone network.

SUMMARY OF THE INVENTION

Accordingly, it is therefore an object of the present invention to provide an improved key phone system.

It is another object to provide a key telephone system that is connected to a digital telephone network and an analog telephone network for multiple subscribers.

It is also an object to provide a multiple subscriber implementing system and method in a key phone system for providing call reception and call transmission services for multiple subscribers through an integrated service digital network line and a public service telephone network line.

These and other objects of the present invention can be achieved by a multiple subscriber implementing method in a key phone system having an integrated service digital network trunk card connected to a digital telephone line, a public switched telephone network trunk card connected to an analog telephone line and an internal memory containing a plurality of logic ports and registered numbers each indicating a corresponding called subscriber terminal. The multiple subscriber implementing method includes a call reception routine of connecting an incoming call containing a called subscriber number to a specific port of a corresponding called subscriber terminal when the incoming call is received through the digital telephone line and the called subscriber number corresponds to one of the registered numbers contained in the internal memory; and a call transmission routine of registering a called subscriber number and transmitting an outgoing call when the digital telephone line is seized by a private line subscriber.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIGS. 2A and 2B show structures of a memory map for supervising private line numbers and multiple subscriber information according to the present invention;

DETAILED DESCRIPTION OF THE PREFERRED EMBODIMENT

Figure 1:
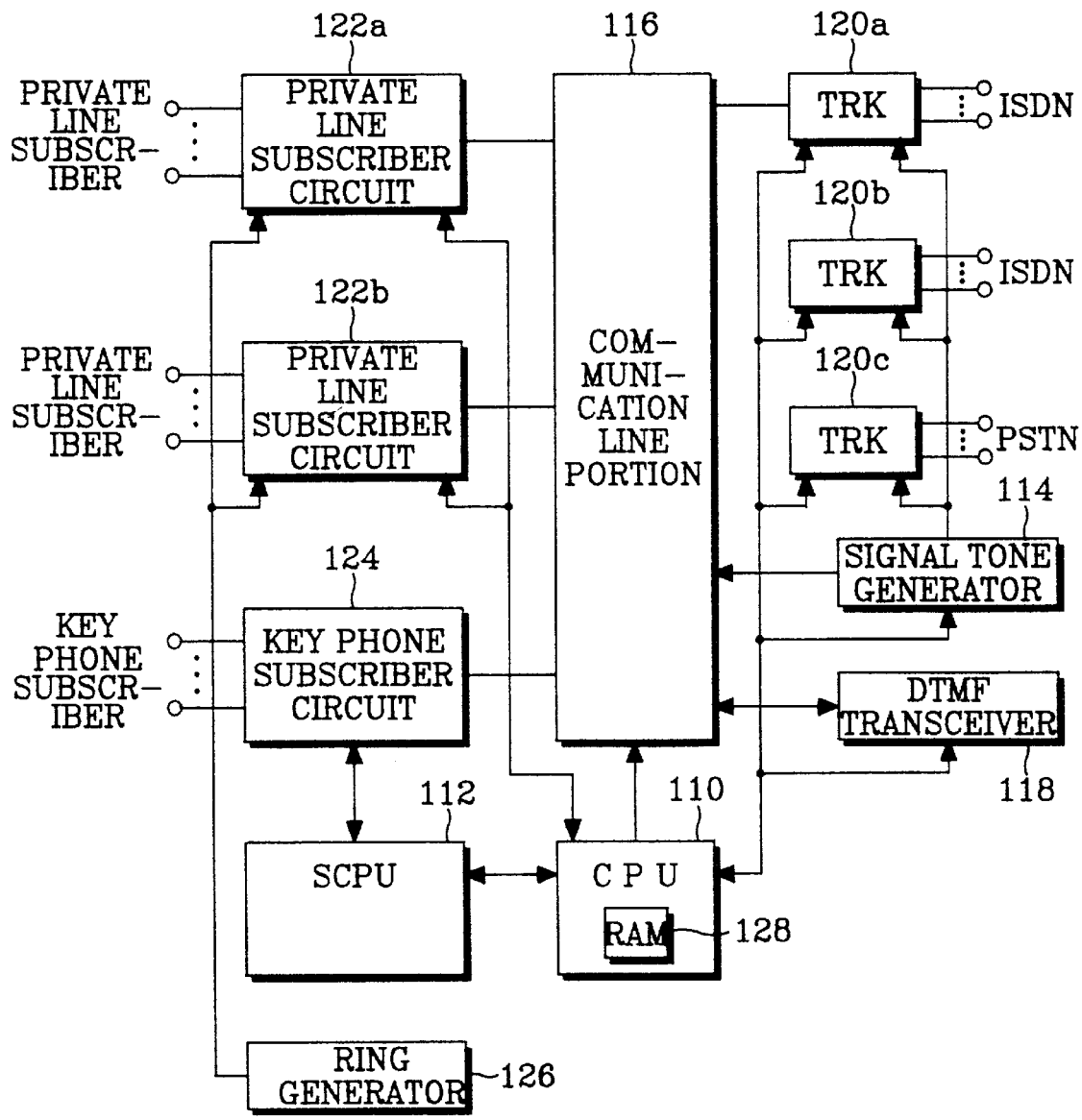
FIG. 1 is a block diagram of a key phone system for accommodating both an integrated service digital network line and a public service telephone network line as constructed according to the principles of the present invention.

Referring now to the drawings and particularly to FIG. 1, which illustrates a key phone system constructed according to the principles of the present invention. The key phone system includes a central processing unit (CPU) 110 containing a random-access-memory (RAM) 128, a supplemental central processing unit (SCPU) 112, a signal tone generator 114, a communication line portion 116, a dual tone multi-frequency transceiver 118, a plurality of integrated service digital network trunk cards 120a and 120b each connecting to a plurality of integrated service digital network lines, a public service telephone network trunk card 120c for connecting to a plurality of public service telephone network lines, a plurality of private line subscriber circuits 122a and 122b each connecting to a plurality of private line subscribers, a key phone subscriber circuit 124 for connecting to a plurality of key phone subscribers and a ring generator 126 for generating a tone signal.

As shown in FIG. 1, the central processing unit 110 controls call switching operations by checking states of various ports of the system, analyzes communication status and provides a variety of call reception and call transmission services to a system user. The central processing unit 110 also diagnoses and maintains the system, and performs a programmed exchange function and a manmachine communication function. In addition, the central processing unit 110 includes the random access memory 128 for storing private line subscriber information and data depending on various kinds of service. The random access memory 128 stores a program performed for overall system and various tables necessary for the program performance.

Supplemental central processing unit 112 shares the function as the central processing unit 110 and performs data communication with the key phone subscriber circuit 124 all the time. The signal tone generator 114, generates a tone signal used in the system and dial pulses, in which the tone signal are generated as single tones and complex tones. The communication line portion 116 forms a communication line by the control of the central processing unit 110. The dual tone multi-frequency transceiver 118 converts a dual-tone multi-frequency (DTMF) signal input from the communication line portion 116 into a binary code to then offer the same to the central processing unit 110 and converts a dial pulse signal into a dual tone multi-frequency signal so as to transmit the same to the communication line portion 116.

Integrated service digital network and public service telephone network trunk cards (TRK) 120a, 120b and 120c control the office line usage of private line subscribers and key phone subscribers. Each trunk card 120a, 120b or 120c includes four office lines which can be either digital integrated service digital network lines or analog public service telephone network lines. In addition, according to commercialized integrated service digital networks, the TRKs 120a, 120b and 120c using an analog public service telephone network line having a single called subscriber number as an office line may be replaced by a basic rate interface (BRI) using multiple channels or a primary rate interface.

Private line subscriber circuits 122a and 122b are extension subscriber circuits for subscribers using general telephones as single line subscribers. The private line subscriber circuits 122a and 122b supply operation power to the corresponding subscriber terminal under control of the central processing unit 110 and connects the communication line portion 116 to the corresponding subscriber terminal. The key phone subscriber circuit 124 is a subscriber circuit for subscribers using the exclusive key telephones. The key phone subscriber circuit 124 receives data from a key phone subscriber terminal to transmit the same data to the communication line portion 116, or receives the data to be transmitted to the key phone subscriber terminal. The ring generator 126 generates a ring signal and supplies the same to the corresponding private line subscriber circuits 122a and 122b.

FIGS. 2A and 2B illustrate a structure of a memory map contained in the random access memory 128 of the central processing unit 110 for supervising private line numbers and multiple subscriber information according to the principles of the present invention. FIG. 2A shows a memory map for supervising multiple subscriber numbers (MSN) and logic port numbers corresponding to an office line port number of an office line connected to the key phone system in case when a call is received through an integrated service digital network. FIG. 2B shows a memory map for supervising multiple subscriber numbers and office line port numbers corresponding to a call requesting private line number representing a subscriber number of a subscriber circuit connected to the key phone system using the integrated service digital network as the office line.

Figure 3:
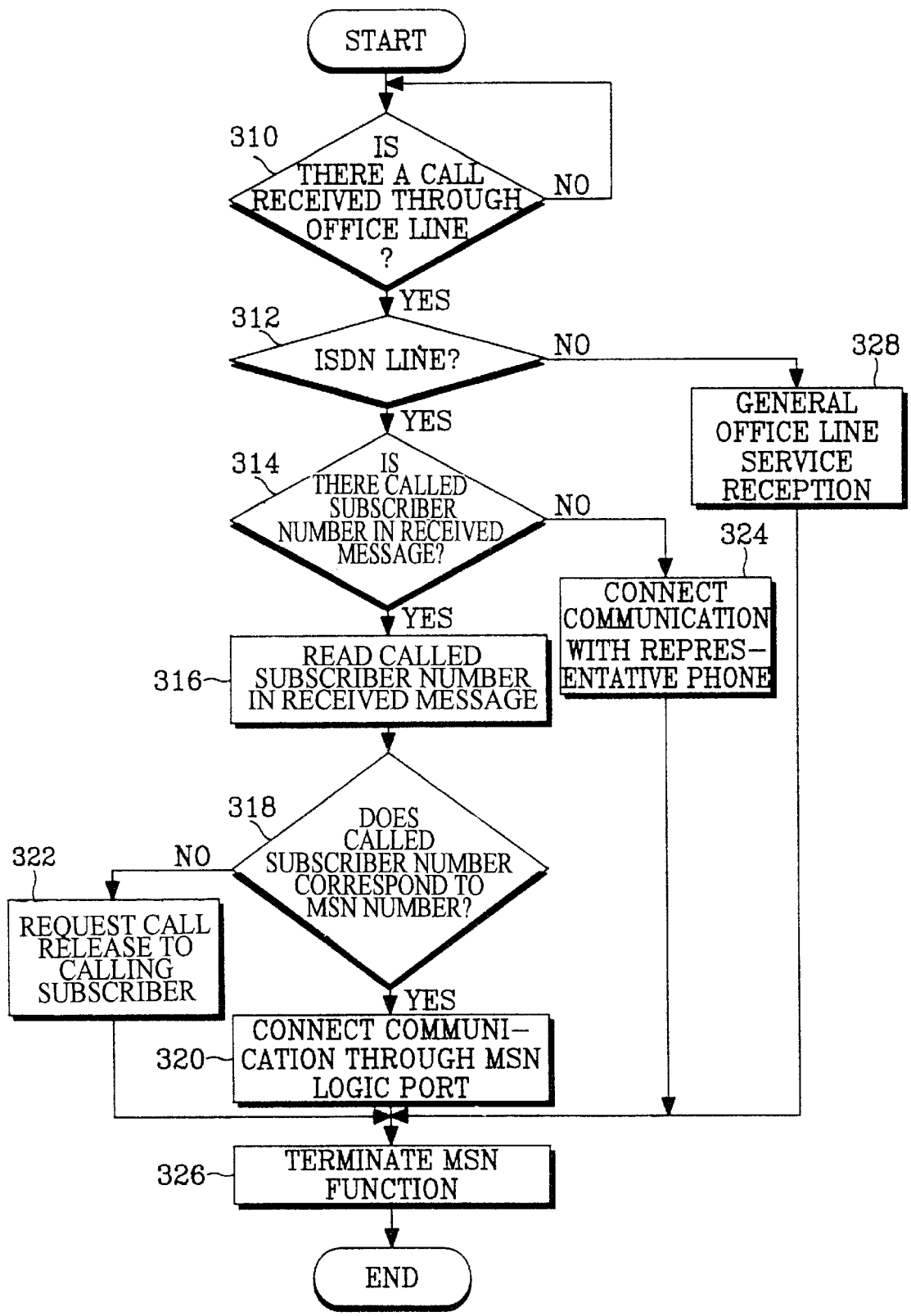
FIG. 3 is a control flow diagram for offering a call reception service through an integrated service digital network line according to the present invention.

Turning now to FIG. 3 which illustrates a process of offering a call reception service through the integrated service digital network according to the principles of the present invention. The call reception service process includes the steps of determining whether there is a called subscriber number in a received message when a call is received through the integrated service digital network line, checking whether the received called subscriber number corresponds to a multiple subscriber numbers number stored in an internal random access memory, connecting the corresponding office line to the multiple subscriber numbers logic port when the received called subscriber number corresponds to the multiple subscriber numbers number, and requesting the release of the received call when the received called subscriber number does not correspond to the multiple subscriber numbers number, and connecting communication to a representative telephone when there is no called subscriber number in the received message.

Figure 4A:
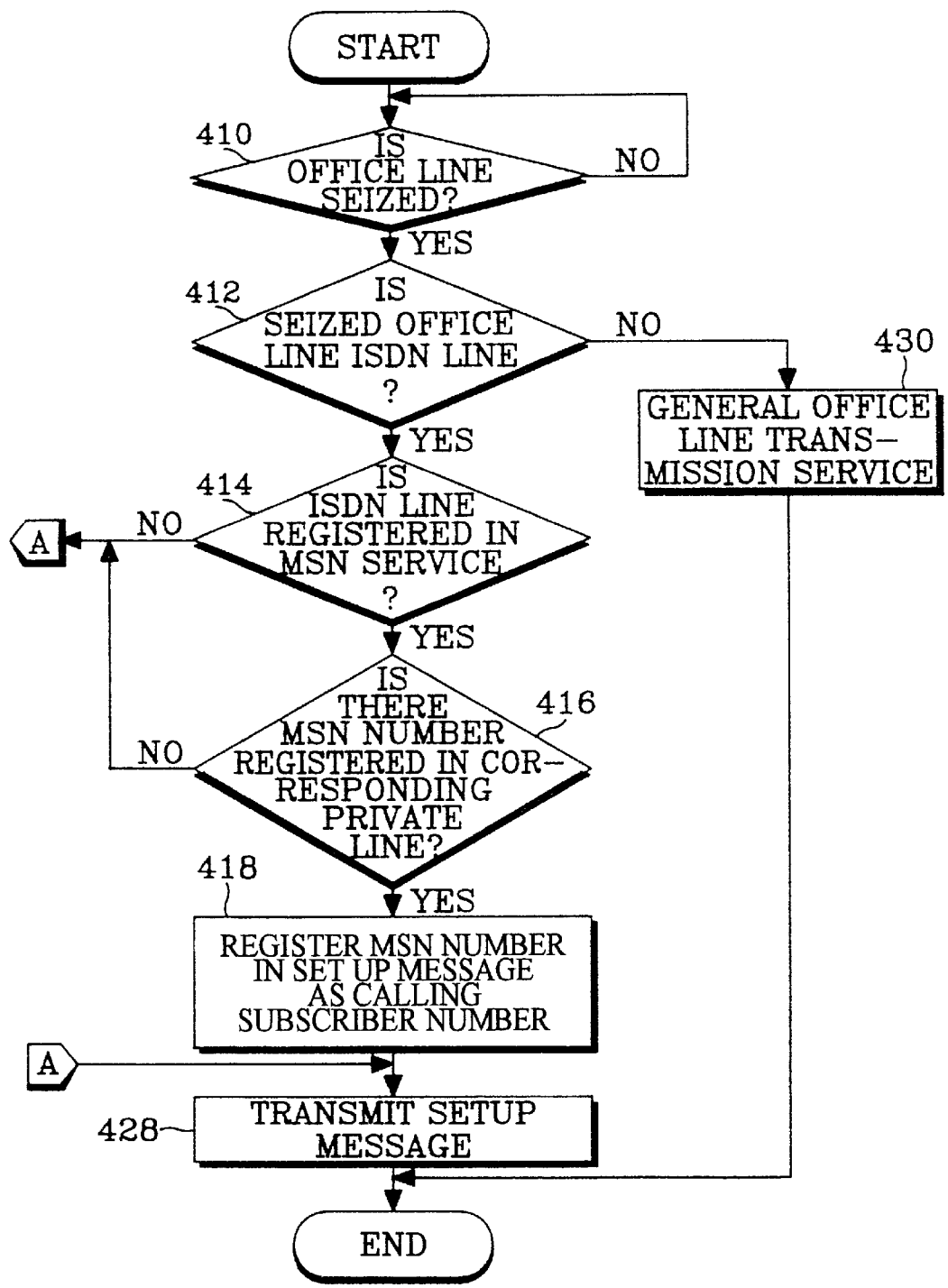
FIG. 4 is a control flow diagram for offering a call transmission service through an integrated service digital network line according to the present invention.
Figure 4B:
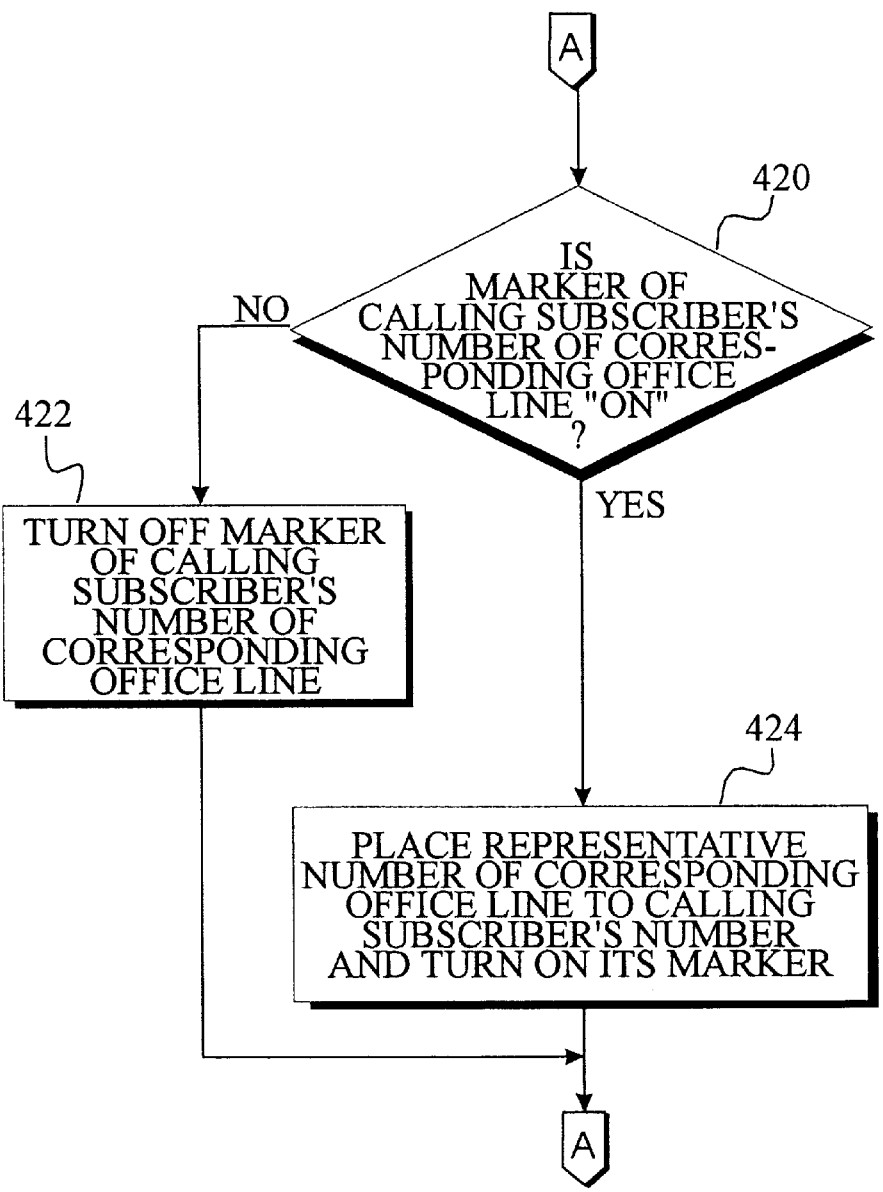

FIG. 4 illustrates a process of offering a call transmission service through the integrated service digital network according to the principles of the present invention. The call transmission service process includes the steps of determining whether there is an office line seized in response to an outgoing call, determining whether a seized office line is registered in an multiple subscriber numbers service when the seized office line is the integrated service digital network line, determining whether there is an multiple subscriber numbers number registered in the corresponding private line if the seized office line registered in the multiple subscriber numbers service, registering the multiple subscriber numbers number as a calling subscriber number in a set-up message to transmit the set-up message when there is the multiple subscriber numbers number registered in the corresponding private line, and requesting a call release to the corresponding terminal when there is no multiple subscriber numbers number registered in the corresponding private line, determining whether there is a request of an office line transmission or private line abbreviation if the seized office line is not registered in the multiple subscriber numbers service, setting the abbreviation bit of the set-up message to "ON" and then transmitting the set-up message if there is a request, setting the abbreviation bit to "OFF" and then transmitting the set-up message.

An embodiment of the present invention will now be described in details with reference to FIGS. 1 through 4.

First, a call reception process will now be described in detail with reference to FIG. 3. When an incoming call is received through an office line at step 310, the central processing unit 110 determines whether the incoming call is received through either a digital integrated service digital network line or a general analog public service telephone network line at step 312. If the incoming call is not received through the digital integrated service digital network line, that is, an analog public service telephone network line at step 312, the central processing unit 110 performs a general office line reception service at step 328. However, if the incoming call is received through the digital integrated service digital network line at step 312, the central processing unit 110 determines whether there is a called subscriber number in a message received through the integrated service digital network line at step 314. If there is no called subscriber number in a received message from the integrated service digital network line at step 314, central processing unit connects communication to a representative phone registered as "a null" in an internal random access memory 128 of a table as shown in FIG. 2A at step 324.

However, if there is a called subscriber number in a received message from the integrated service digital network line at step 314, the central processing unit 110 reads the called subscriber number presented in the received message at step 316. Then, the central processing unit 110 determines whether the read called subscriber number in the received message corresponds to one of multiple subscriber numbers registered in the internal random access memory 128 at step 318. When there is no multiple subscriber numbers number registered in the internal random access memory 128 that corresponds to the called subscriber number at step 318, the central processing unit 110 requests a call release to a transmitting or calling subscriber at step 322, and then proceeds to step 326 to terminate the multiple subscriber numbers function. If, however, the called subscriber number corresponds to a multiple subscriber numbers number registered in the internal random access memory 128 at step 318, the central processing unit 110 reads a logic port corresponding to the multiple subscriber numbers number from the table shown in FIG. 2A and connects an office line communication to the read logic port at step 320. Then, the central processing unit 110 proceeds to step 326 to terminate multiple subscriber numbers function.

Referring now to FIG. 4, a call transmission process will be described in detail as follows. When an office line for call transmission is seized in response to an outgoing call at step 410, the central processing unit 110 determines whether the seized office line is a digital integrated service digital network line at step 412. If the seized office line is not a digital integrated service digital network line, that is, a general office public service telephone network line at step 412, the central processing unit 110 performs a general office line transmission service at step 430

When the seized office line is a digital integrated service digital network line, however, the central processing unit 110 determines whether the seized integrated service digital network line is registered in a multiple subscriber numbers service at step 414. If the seized integrated service digital network line is not registered in the multiple subscriber numbers service, the central processing unit 110 determines whether the calling subscriber's number marker of the corresponding office line is turned on at step 420. If the calling subscriber's number marker is turned on at step 420, a representative number is registered to the calling subscriber number in a set-up message and the calling subscriber's number marker is turned on at step 424. The marker is used to input the multiple subscriber numbers number as a calling subscriber's number contained in a set-up message so that the subscriber can determine whether the calling subscriber's number is transmitted or not. When the marker setting is completed, the central processing unit 110 transmits the set-up message at step 428. However, if the calling subscriber's number marker is off at step 420, the central processing unit 110 proceeds to turn off the calling subscriber's number marker at step 422 and then returns to step 428 so as to transmit the set-up message.

In step 414, if the integrated service digital network line is registered in the multiple subscriber numbers service, the central processing unit 110 determines whether there is a multiple subscriber numbers number registered in the corresponding private line of the private line subscriber who requests a communication at step 416. If there is no multiple subscriber numbers number registered in the corresponding private line at step 416, the central processing unit 110 proceeds to step 420 to determine whether a calling subscriber's number marker of the corresponding office line is turned on. If, however, there is a multiple subscriber numbers number registered in the corresponding private line at step 416, the central processing unit 110 registers the multiple subscriber numbers number as a calling subscriber number in a set-up message at step 418 and then proceeds to step 428 to transmit the set-up message.

As described above, the present invention provides a multiple subscriber implementing method in a key phone system for effectively providing call reception and call transmission services for multiple subscribers through an integrated service digital network line and a public service telephone network line. Since there is a plurality of called subscriber numbers available, an office line port is processed like plural ports by referring to office line port numbers of the calls received with respect to an office line. In addition, in the transmission of outgoing calls, since a plurality of called subscriber numbers are properly divided to then be used, private lines or private line groups can have independent office line numbers with fewer office lines, thereby efficiently utilizing office lines for communication purposes.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the appended claims.

What is claimed is:

1. A multiple subscriber implementing method in a key phone system, comprising:

a call reception routine of connecting an incoming call containing a called subscriber number to a specific port of a corresponding called subscriber terminal of said key phone system comprising an integrated service digital network trunk card connected to a digital telephone line, a public switched telephone network trunk card connected to an analog telephone line and an internal memory containing a plurality of logic ports and registered numbers each indicating said corresponding called subscriber terminal, when said incoming call is received through the digital telephone line and said called subscriber number corresponds to one of said registered numbers contained in said internal memory; and a call transmission routine of registering a calling subscriber number and transmitting an outgoing call via the digital telephone line, when the digital telephone line is seized by a private line subscriber.

2. The method of claim 1, further comprised of said call reception routine comprising:

primarily determining whether there is a called subscriber number contained in the incoming call when the incoming call is received through said digital telephone line;

primarily connecting communication to a representative phone port when there is no called subscriber number contained in the incoming call; and secondly connecting communication to a called subscriber number port when there is said called subscriber number contained in the incoming call.

3. The method of claim 2, further comprising:

reading said called subscriber number from the incoming call received through said digital telephone line;

connecting communication to the corresponding private line subscriber port when there is a private line subscriber corresponding to the read called subscriber number; and requesting a call release to a calling subscriber when there is no private line subscriber corresponding to said read called subscriber number.

4. The method of claim 1, further comprised of said call transmission routine comprising:

determining whether the seized digital telephone line is registered in a multiple subscriber service when said digital telephone line is seized by said private line subscriber;

setting a representative number and a calling subscriber number marker of a set-up message and primarily transmitting said set-up message when said seized digital telephone line is not registered in said multiple subscriber service; and registering said calling subscriber number in said set-up message and transmitting said set-up message when said seized digital telephone line is registered in said multiple subscriber service.

5. The method of claim 4, further comprising:

registering a representative number in said set-up message and setting a calling subscriber number marker to "ON" when said calling subscriber number marker is turned on; and setting said calling subscriber number marker of said setup message to "OFF" when said calling party number marker of the corresponding digital telephone line is turned off.

6. A method for call reception in a key phone system, comprising:

determining whether an incoming call is received through one of a digital telephone line and an analog telephone line in said key phone system having an integrated service digital network trunk card connected to said digital telephone line, a public switched telephone network trunk card connected to said analog telephone line and an internal memory containing a plurality of logic ports and registered numbers each indicating a corresponding called subscriber terminal;

determining whether there is a called subscriber number in the incoming call, when the incoming call is received through said digital telephone line;

determining whether said called subscriber number corresponds to one of the registered numbers contained in said internal memory, when there is said called subscriber number in the incoming call;

requesting a call release from a calling subscriber, when said called subscriber number does not correspond to any of the registered numbers contained in said internal memory; and connecting communication with a called subscriber terminal through a corresponding logic port, when said called subscriber number corresponds to one of the registered numbers contained in the internal memory.

7. The method of claim 6, further performing a general office line service reception of the incoming call, when the incoming call is received through said analog telephone line.

8. The method of claim 6, further connecting communication with a representative telephone, when there is no called subscriber number in the incoming call.

9. The method of claim 8, further performing a general office line service reception of the incoming call, when the incoming call is received through said analog telephone line.

10. A call transmission method, comprising:

determining whether an office line is seized in response to an outgoing call in a key phone system having an integrated service digital network trunk card connected to a digital telephone line, a public switched telephone network trunk card connected to an analog telephone line and an internal memory containing a plurality of logic ports and registered numbers each indicating a corresponding called subscriber terminal;

determining whether a seized office line corresponds to one of said digital telephone line and said analog telephone line;

determining whether the seized office line is registered in a multiple subscriber number service contained in said internal memory, when the seized office line corresponds to said digital telephone line;

determining whether there is a multiple subscriber number registered in said internal memory in correspondence with the office line of a calling subscriber who initiates said outgoing call, when the seized office line is registered in said multiple subscriber number service;

registering said multiple subscriber number in a set-up message as a calling subscriber number and transmitting the set-up message via a communication channel, when there is a multiple subscriber number registered in said internal memory;

determining whether a marker of the calling subscriber number of the corresponding office line is turned "on", when there is no multiple subscriber number registered in said internal memory or when the seized office line is not registered in said multiple subscriber number service; and registering a representative telephone number of the corresponding office line in the set-up message as the calling subscriber number, and transmitting the set-up message via said communication channel, when the marker of the calling subscriber number of the corresponding office line is turned "on".

11. The method of claim 10, further performing a general office line service transmission of the outgoing call, when the seized office line corresponds to said analog telephone line.

12. The method of claim 10, further turning "off" the marker of the calling subscriber number of the corresponding office line, when the marker of the calling subscriber number of the corresponding office line is not turned "on".

13. The method of claim 12, further performing a general office line service transmission of the outgoing call, when the seized office line corresponds to said analog telephone line.

14. The method of claim 10, further comprising:
   determining, during call reception, whether an incoming call is received through one of said digital telephone line and said analog telephone line;
   determining whether there is a called subscriber number in the incoming call, when the incoming call is received through said digital telephone line;
   determining whether said called subscriber number corresponds to one of the registered numbers contained in said internal memory, when there is said called subscriber number in the incoming call;
   requesting a call release from a calling subscriber, when said called subscriber number does not correspond to any of the registered numbers contained in said internal memory; and
   connecting communication with a called subscriber terminal through a corresponding logic port, when said called subscriber number corresponds to one of the registered numbers contained in the internal memory.

15. The method of claim 14, further performing a general office line service reception of the incoming call, when the incoming call is received through said analog telephone line.

16. A multiple subscriber key phone system, comprising:
   an integrated service digital network trunk card connected to a digital telephone line;
   a public switched telephone network trunk card connected to an analog telephone line;
   an internal memory containing a plurality of logic ports and registered numbers each indicating a corresponding called subscriber terminal;
   a central processing unit maintaining communications between said integrated service digital network trunk card and said public switched telephone network trunk card by:
      connecting an incoming call containing a called subscriber number to a specific port of a corresponding called subscriber terminal, when said incoming call is received through the digital telephone line and said called subscriber number corresponds to one of said registered numbers contained in said internal memory; and
      registering a calling subscriber number and transmitting an outgoing call via the digital telephone, when the digital telephone line is being used for communication by a private line subscriber.

17. The system of claim 14, further comprised of said central processing unit connecting said incoming call by:
   primarily determining whether there is a called subscriber number contained in the incoming call when the incoming call is received through said digital telephone line;
   primarily connecting communication to a representative phone port when there is no called subscriber number contained in the incoming call; and
   secondly connecting communication to a called subscriber number port when there is said called subscriber number contained in the incoming call.

18. The system of claim 17, further comprised of said central processing unit:
   reading said called subscriber number from the incoming call received through said digital telephone line;
   connecting communication to the corresponding private line subscriber port when there is a private line subscriber corresponding to the read called subscriber number; and
   requesting a call release to a calling subscriber when there is no private line subscriber corresponding to said read called subscriber number.

19. The system of claim 16, further comprised of said central processing unit registering said calling subscriber number and transmitting said outgoing call by:
   determining whether the seized digital telephone line is registered in a multiple subscriber service when said digital telephone line is seized by said private line subscriber;
   setting a representative number and a calling subscriber number marker of a set-up message and primarily transmitting said set-up message when said seized digital telephone line is not registered in said multiple subscriber service; and
   registering said calling subscriber number in said set-up message and transmitting said set-up message when said seized digital telephone line is registered in said multiple subscriber service.

20. The system of claim 19, further comprised of said central processing unit:
   registering a representative number in said set-up message and setting a calling subscriber number marker to "ON" when said calling subscriber number marker is turned on; and
   setting said calling subscriber number marker of said setup message to "OFF" when said calling party number marker of the corresponding digital telephone line is turned off.

21. A method for enabling call transmission and reception in a telephone system, comprising the steps of:
   determining whether an office line is seized in response to an outgoing call in said telephone system comprised of a plurality of extension subscriber terminals;
   determining whether a seized office line corresponds to one of a digital telephone line and an analog telephone line;
   determining whether the seized office line is registered in a multiple subscriber number service provided by said telephone system, when the seized office line corresponds to said digital telephone line;
   when the seized office line is registered in said multiple subscriber number service provided by said telephone system, determining whether there is a multiple subscriber number registered in said telephone system in correspondence with the office line of a calling subscriber who initiates said outgoing call;
   when there is a multiple subscriber number registered in said telephone system, registering said multiple subscriber number in a set-up message as a calling subscriber number and transmitting the set-up message via a communication channel;
   when there is no multiple subscriber number registered in said telephone system or when the seized office line is not registered in said multiple subscriber number service, determining whether a marker of the calling subscriber number of the corresponding office line is activated; and
   when the marker of the calling subscriber number of the corresponding office line is activated, registering a representative telephone number of the corresponding office line in the set-up message as the calling subscriber number, and transmitting the set-up message via said communication channel.

22. The method of claim 21, further comprised of deactivating the marker of the calling subscriber number of the corresponding office line, when the marker of the calling subscriber number of the corresponding office line is not activated.

23. The method of claim 21, further performing a general office line service transmission of the outgoing call, when the seized office line corresponds to said analog telephone line.

24. The method of claim 21, further comprising the steps of:

determining, during call reception, whether an incoming call is received through one of said digital telephone line and said analog telephone line;

when the incoming call is received through said digital telephone line, determining whether there is a called subscriber number in the incoming call;

when there is said called subscriber number in the incoming call, determining whether said called subscriber number corresponds to one of the registered numbers provided in said telephone system;

when said called subscriber number does not correspond to any of the registered numbers provided in said telephone system, requesting a call release from a calling subscriber; and when said called subscriber number corresponds to one of the registered numbers provided in said telephone system, connecting for communication with a called subscriber terminal through a corresponding logic port.

25. The method of claim 24, further performing a general office line service reception of the incoming call, when the incoming call is received through said analog telephone line.

* * * * *